Patented Aug. 16, 1932

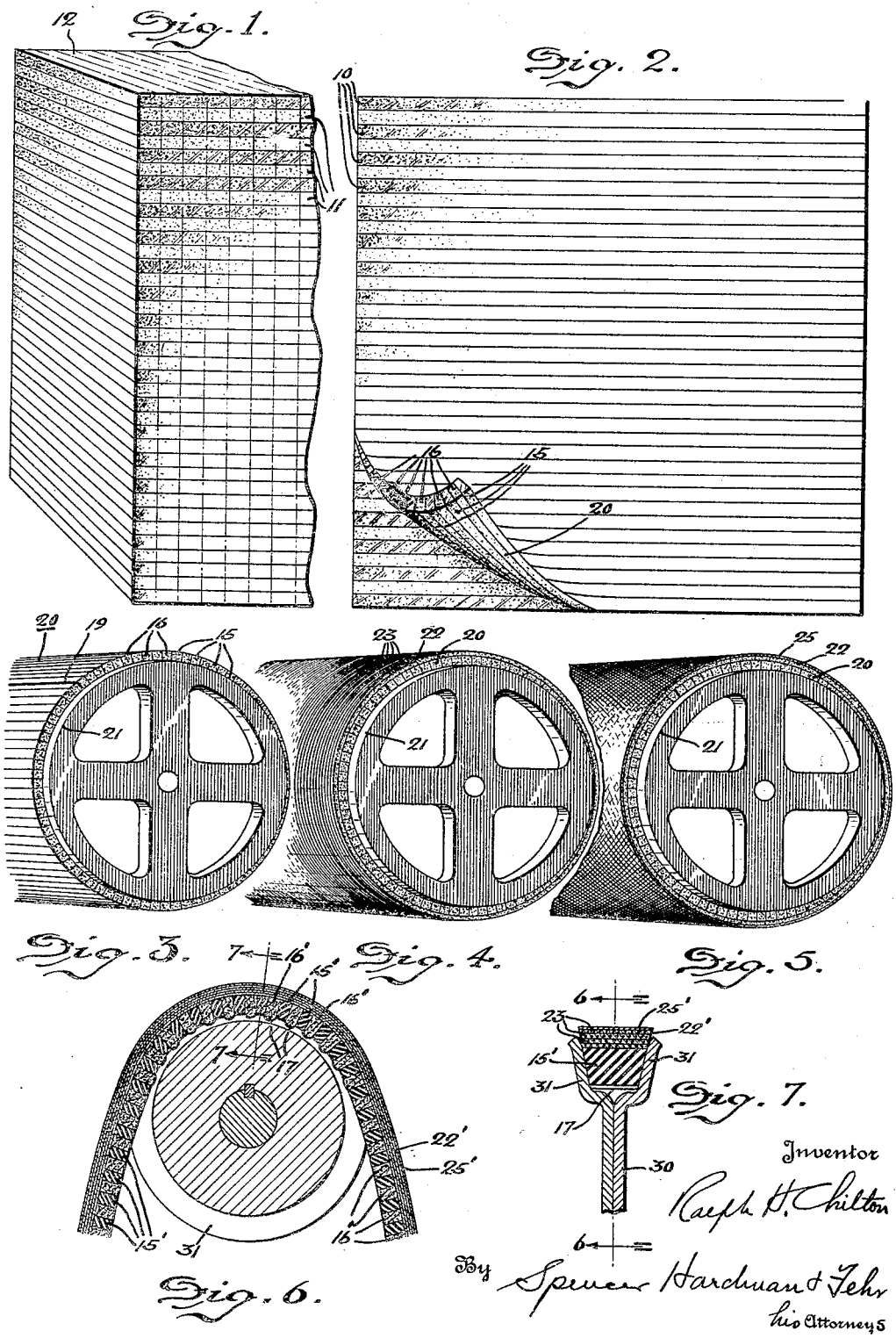

1,871,953

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

METHOD OF MAKING V-TYPE TRANSMISSION BELTS

Original application filed June 13, 1927, Serial No. 198,377. Divided and this application filed June 20, 1928. Serial No. 286,933.

This invention relates to a method of making transmission belts of rubber and textile composition of the type employed with V-groove pulleys.

Heretofore such belts have been made by vulcanizing a cylinder of plied rubber and fabric material and then cutting off the separate V-section belts from said cylinder by a knife or knives inclined at the desired angle to the axis of the cylinder, as substantially disclosed in Patent No. 1,538,303 to Charles R. Short.

An object of this invention is to provide a side driving belt having an outer flexible rubberized fabric portion adapted to transmit the driving tension on the belt, and an inner pulley contact portion bonded by vulcanization to said fabric portion and adapted to frictionally engage the V-groove in the pulley, said inner portion being so formed as to be very flexible longitudinally of the belt but highly resistant to distortion of the cross section thereof whereby to resist lateral compression by the V-groove of the pulley and to prevent uneven wear on the inner portion of the belt. A more specific object is to provide such a belt having an inner pulley contact portion comprising longitudinally spaced transverse teeth of relatively stiff rubber composition and relatively soft rubber vulcanized in place between said teeth.

Another feature of this invention is the stiffening of these transverse teeth by embedding loose fiber, threads, or fabric therein which will also increase the wearing properties thereof and lengthen the life of the belt.

Another object of the invention is to provide an economical method of making this improved belt, as follows: by first providing a sheet of uncured rubber material having alternate transverse layers of relatively stiff and soft rubber compounds, applying this sheet upon a drum with the layers extending longitudinally of the drum, wrapping rubberized fabric peripherally around the outside of said sheet, vulcanizing the whole together to form an integral cylindrical unit, and then cutting off the individual belts from this unit. The herein described belt is claimed as an article in my co-pending application, Serial No. 198,377, filed June 13, 1927, of which this present application is a division.

Further objects and advantages of the present invention will be apparent from the following description, reference being had to the accompanying drawing, wherein a preferred embodiment of one form of the present invention is clearly shown.

In the drawing:

Fig. 1 is a perspective view of a portion of a stack of sheets of uncured rubber compound, the top-most sheet and the alternate sheets being of such compound that when cured they will form hard or relatively stiff rubber material while the remaining alternate sheets are of such compound that when cured they will form relatively soft and yieldable rubber.

Fig. 2 is a side elevation of the stack shown in Fig. 1 and illustrates in a diagrammatic way how the laminated sheets are sliced off from this stack.

Fig. 3 is a perspective view of a portion of the vulcanizing drum and illustrates how the transversely laminated sheet of uncured rubber material is first applied thereto with the laminations or strips extending axially of the drum.

Fig. 4 is a perspective view similar to Fig. 3, but illustrates an additional step in the process, showing rubberized cord fabric wrapped peripherally upon the outside of the laminated sheet of uncured rubber material.

Fig. 5 is similar to Figs. 3 and 4 and illustrates another step in the process, showing a relatively thin layer of rubberized bias cut fabric wrapped peripherally upon the outside of the cord fabric.

Fig. 6 is a section taken on line 6—6 of Fig. 7 of the finished belt of this invention riding upon its pulley and shows in a somewhat diagrammatic manner the distortion of the soft rubber between the relatively stiff teeth to permit the easy longitudinal flexing of the belt around the pulley with little or no tendency to distort the transverse section of the relatively stiff teeth, thereby providing long wear of the stiff teeth and good frictional contact with the side walls of the V-groove in the pulley.

Fig. 7 is a transverse section through the belt riding within the V-groove of the pulley and is taken on line 7—7 of Fig. 6 extending through one of the stiff rubber teeth. This figure illustrates how the stiff teeth fit accurately and snugly within the V-groove, leaving a small space between the bottom of the belt and groove into which the soft rubber may easily bulge slightly to provide for easy flexing of the belt around the pulley.

Similar reference characters refer to similar parts throughout the drawing.

In carrying out the process of making belts according to this invention there is first prepared a sheet 20 of uncured rubber material having alternate transverse layers or strips of relatively stiff and soft rubber compounds which when vulcanized will form relatively stiff and soft yieldable rubber. This sheet 20 may be prepared as follows: A number of sheets 10 of the uncured stiff rubber compound are prepared separately from a corresponding number of sheets 11 of the soft rubber compound. These sheets 10 and 11 are then stacked one upon the other, alternately, to form a laminated stack 12 as shown in Fig. 1, the height of the stack being equal to the linear length of the belts which are to be made therefrom. The transversely laminated sheets 20 may then be sliced off the edge of the stack 12 by any suitable means, such as by a rapidly rotating circular knife kept wet with running water to facilitate the cutting of the rubber. This method of cutting unvulcanized rubber is well known in the art and no claim is made as to the novelty of this particular method of slicing off sheets of unvulcanized rubber. It will be clear from the above description and the drawing that this uncured sheet 20, cut to a thickness equal to the depth of the teeth portion desired in the belt to be formed, will be laminated or composed of alternate transverse layers or strips 15 and 16 which will form when vulcanized relatively stiff and relatively soft yieldable rubber compounds respectively. The strips 15 will be formed from the sheets 10 of the stack 12 while the strips 16 will be formed from the alternate sheets 11 of said stack. Of course a very large number of such sheets 20 are sliced off successively from the one stack 12, the dimensions of stack 12 being such that the sheets 20 sliced therefrom are of the proper width and length for the purpose for which they are used, as will hereinafter appear.

One of these sheets 20 is then applied upon a suitable drum 21 with the length of strips 15 and 16 thereof extending axially of the drum, as clearly shown in Fig. 3, while the depth of strips 15 and 16 extend radially of the drum 21. The length of sheet 20 may be such that the edges thereof abut along the line 19 to form a smooth butt joint or, if desired, the edges may be feathered off somewhat and slightly overlapped to form a lap joint.

Next, a sufficient length of suitable rubberized fabric is wound upon the outside of the sheet 20 to form a plurality of layers thereupon, thus forming the strong flexible outer or tension portion 22 of the belt (see Fig. 4). The properties especially desired in this tension portion 22 are tensile strength, non-stretchability, and a high degree of flexibility to minimize the tendency of the belts to heat up due to internal friction caused by rapidly bending the belt around the pulleys upon which it runs. For this reason the portion 22 is preferably formed from rubberized cord fabric having substantially non-extensible cords 23 extending peripherally around the drum 21. If desired, the cord fabric may be pre-stretched, that is, have a certain amount of its natural stretch taken out, before it is applied to the drum 21 in order to render the portion 22 substantially non-extensible.

Preferably one or more outer layers 25 of bias cut woven fabric are wrapped around the outside of the cord fabric portion 22 to form a sort of outside protective casing for the belt. This protective casing 25 is preferably relatively thin, as clearly illustrated in Fig. 5, since a thick casing would materially decrease the flexibility of the belt without a corresponding increase in its tensile strength, and also would hinder the transfer of heat from the belt interior to the surrounding air, both of which effects tend to cause heating up of the belt in use under rigorous conditions.

The rubber and fabric cylindrical unit being now formed as above described, it is tightly wrapped with vulcanizing tape and cured in open steam in a manner well known in the art of curing rubber. The steam pressure used and length of cure is so chosen that the rubber compound of which the strips 15 and 16 are formed will cure to form respectively hard or relatively stiff rubber and relatively soft yieldable rubber. These strips 15 and 16 will be very firmly bonded by vulcanization to the fabric portion 22 of the cylindrical unit. Of course the separate layers of the cord fabric portion 22 and the fabric casing 25 will be thoroughly bonded together by the cure of the rubber in the rubberized fabric.

After curing of the cylindrical unit as above mentioned, the vulcanizing tape is stripped therefrom and the drum 21 is mounted upon suitable bearings so that it can be rotated against a knife angularly inclined to the drum axis whereby the cylindrical unit is cut into individual belts of the desired width and taper. This method of cutting a molded rubber and fabric cylindrical unit into individual V-shaped belts is now well known in the art, reference being hereby made to the disclosures in Patent #1,538,303 to C. R. Short.

A transverse section of the completed V-shaped belt riding in the V-groove in its pulley is shown in Fig. 7, and a longitudinal section thereof is shown in Fig. 6. The strong flexible non-extensible cord fabric portion 22' of the belt is obviously cut from the portion 22 of the cylindrical unit while the protective outer casing 25' of the belt is cut from the portion 25 of the unit. The inner pulley contact portion of the belt will obviously consist of alternate relatively stiff transverse teeth 15' and relatively soft teeth 16' cut from the strips 15 and 16 respectively of the inner sheet or slab 20 of the cylindrical unit. The relatively stiff teeth 15' are sufficiently stiff to resist any material distortion due to the wedging action of the inclined walls 31 of the V-groove in pulley 30. In other words, the teeth 15', being highly resistant to lateral compression, can bear tightly against the side walls 31 of the V-groove and thus obtain a very good driving contact therewith without at the same time being wedged down into the V-groove with a consequent tendency to heat up due to the energy absorbed in wedging the teeth down into the groove as they pass upon the pulley and later in pulling the teeth from the groove as they pass off from the pulley. It will also be obvious that by substantially eliminating such wedging action the side surfaces of the teeth 15' will wear indefinitely and hence the useful life of the belt will be greatly increased.

It is important that the belt be very flexible longitudinally to enable it to be easily bent around the pulleys without any substantial amount of internal friction due to such bending. This desired longitudinal flexibility is obtained in the inner pulley contact portion of the belt by the relatively soft and easily distortable teeth 16' alternately interposed between the relatively hard teeth 15'. Obviously the spacing between the hard teeth 15' is slightly reduced where the belt is bent around the pulley, as clearly shown in Fig. 6, this reduction of the spacing being permitted by the soft teeth 16' bulging radially inwardly, as shown at 17 in Figs. 6 and 7 in an exaggerated form for clear illustration.

High longitudinal flexibility is obtained in the portion 22' of the belt by the rubberized cord fabric layers being as few in number (four being illustrated) as is consistent with the desired tensile strength of the belt and by providing only a quite thin protective casing 25' thereupon. The peripherally extending cords 23 of the portion 22' render said portion substantially non-stretchable longitudinally and therefore the tension of the belt upon its pulleys will not vary but the belt will retain for a long time the desired tension to which it is adjusted when installed.

The relatively hard teeth 15' preferably have their stiffness or hardness increased by being compounded with loose fibers, threads, or woven cotton material, thereby also rendering said teeth more resistant to wear where they engage the metal walls 31 of the V-groove of the pulley. Of course such compounding is readily done while the unvulcanized sheets 10 are being formed, as will be clearly understood by those skilled in the art. Loose cotton fibers or lacerated waste pieces of rubberized fabric may be thoroughly milled into the rubber compound of which the sheets 10 are formed, thereby giving a tangled mass of fibers and threads embedded throughout the body of the sheets 10.

Or, if desired, woven cotton fabric may be applied by means of a calender to both upper and lower surfaces of the sheets 10 while they are in one continuous strip, that is, before they are cut apart to form the separate sheets which are to be stacked up with the soft compound sheets 11 to form the laminated stack 12 shown in Figs. 1 and 2. By this method the strips 15 of the laminated sheet 20 will have a layer of woven fabric embedded in each radial surface thereof when sheet 20 is applied to the drum 21 as shown in Fig. 3. Obviously these layers of woven fabric will tend to maintain a sharper or more exact plane of division between the rubber compound of strips 16 and that of strips 15 during the vulcanization of the cylindrical unit as above described. In other words, the radial layers of woven fabric will lie between the hard vulcanizing rubber compound of strips 15 and the soft vulcanizing rubber compound of strips 16 and thereby limit the intermixture during vulcanization of these two separate compounds which have individual vulcanizing characteristics. As will be clear to those skilled in the art, the compound of the strips 15 will have a very much higher sulphur and accelerator content than the compound of strips 16 in order to obtain the desired difference in the degree of hardness of these strips after vulcanization. These radial layers of woven fabric embedded in the transverse surfaces of the teeth 15' of the finished belt will aid in conducting to the surrounding air the heat generated by internal friction in the soft rubber teeth 16' due to the slight distortion of said teeth 16' as the belt bends around the pulley. This is because cotton fabric is ordinarily a better conductor of heat than rubber. Also the edges of the fabric layers improve the wearing qualities of the wearing surfaces of the teeth 16'.

The soft rubber teeth 16' are of course firmly bonded to the hard rubber teeth 15' and also to the fabric portion 22', and hence they aid in bonding the teeth 15' to the fabric portion 22'. If it were possible to make a belt similar to that shown but with the soft rubber teeth 16' omitted entirely there would be quite a large tendency to shear or pull the teeth 15' from the fabric portion 22', as will be obvious. The tension transmitting portion 22' of the belt preferably lies above and has substantially no frictional contact with the side driving surfaces 31 of the V-groove (as shown in Fig. 7) and therefore there is no damaging lateral compression of the portion 22' to cause internal friction and generate heat therein.

While the form of embodiment of the present invention as herein disclosed, constitutes a preferred form, it is to be understood that other forms might be adopted, all coming within the scope of the claims which follow.

What is claimed is as follows:

1. The steps in the method of making transmission belts comprising: forming a composite sheet of unvulcanized rubber material having alternate strips of stiff and soft rubber compounds extending transverse the thickness of said sheet, applying this sheet upon a vulcanizing drum so that said strips extend longitudinally thereof, wrapping rubberized fabric peripherally around said drum to form a rubberized fabric web on the outside of said sheet, vulcanizing the whole together to form an integral cylindrical unit, and then cutting off endless individual V-belts from said vulcanized unit.

2. The steps in the method of making transmission belts comprising: forming a composite sheet of unvulcanized rubber material having alternate strips of stiff and soft rubber compounds extending transverse the thickness of said sheet, applying this sheet upon a vulcanizing drum so that said strips extend longitudinally thereof, wrapping rubberized cord fabric upon the outside of said uncured sheet so that the substantially non-extensible cords thereof extend peripherally around said drum, vulcanizing the whole together to form an integral composite unit and then cutting off endless individual V-belts from the vulcanized cylindrical unit.

3. The steps in the method of making transmission belts comprising: forming a sheet of uncured rubber material having alternate strips of relatively stiff and soft rubber compounds extending transverse the thickness of said sheet, applying this sheet upon a drum with said strips extending longitudinally of said drum, winding a plurality of layers of rubberized cord fabric upon said uncured sheet so that the substantially non-extensible cords thereof extend peripherally around the drum, vulcanizing the whole together to form an integral composite unit, and then cutting off individual endless V-shaped belts from said composite unit.

4. The steps in the method of making transmission belts comprising: making a composite sheet of uncured rubber material having alternate parallel strips of fibered rubber and relatively soft rubber compounds extending transversely of the thickness of said sheet, applying this composite sheet upon a drum with said strips extending longitudinally thereof, wrapping a layer of rubberized fabric peripherally around the outside of said composite sheet, vulcanizing said fabric layer and composite sheet together, and then cutting off individual endless V-shaped belts from the vulcanized cylindrical units thus formed.

In testimony whereof I hereto affix my signature.

RALPH H. CHILTON.